(12) United States Patent
Yamada

(10) Patent No.: US 9,499,682 B2
(45) Date of Patent: *Nov. 22, 2016

(54) POLYBUTYLENE TEREPHTHALATE RESIN COMPOSITION AND THIN MOLDED ARTICLE

(71) Applicant: WinTech Polymer Ltd., Minato-ku (JP)

(72) Inventor: Shinya Yamada, Fuji (JP)

(73) Assignee: WINTECH POLYMER LTD., Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/272,050

(22) Filed: May 7, 2014

(65) Prior Publication Data

US 2014/0242315 A1   Aug. 28, 2014

Related U.S. Application Data

(62) Division of application No. 12/669,701, filed as application No. PCT/JP2008/002824 on Oct. 7, 2008.

(30) Foreign Application Priority Data

Oct. 17, 2007   (JP) .................................. 2007-269683

(51) Int. Cl.
    C08K 5/103   (2006.01)
    C08K 7/14    (2006.01)
    C08L 67/02   (2006.01)

(52) U.S. Cl.
    CPC ............... C08K 5/103 (2013.01); C08K 7/14 (2013.01); C08L 67/02 (2013.01); Y10T 428/1397 (2015.01)

(58) Field of Classification Search
    CPC .......... Y10T 428/13; Y10T 428/1352; Y10T 428/1397; Y10T 428/1321; Y10T 428/1334; Y10T 428/1359; Y10T 428/1393; C08K 7/14; C08K 5/103; C08L 67/00; C08L 67/02; C08L 67/008
    USPC ....... 524/300, 315, 306, 310–313, 318, 321, 524/322, 605; 428/36.9, 36.91, 36.92, 34.7, 428/35.2, 35.7–35.9; 508/463, 465; 528/272
    See application file for complete search history.

(56) References Cited

U.S. PATENT DOCUMENTS

| | | | |
|---|---|---|---|
| 4,481,324 A | | 11/1984 | Hall et al. |
| 5,039,727 A | * | 8/1991 | Onishi et al. ................ 524/277 |
| 5,128,399 A | | 7/1992 | Mochizuki et al. |
| 5,258,434 A | | 11/1993 | Hanabusa |
| 5,273,810 A | | 12/1993 | Nakano et al. |
| 6,629,769 B2 | | 10/2003 | Kosugi et al. |
| 6,656,988 B1 | | 12/2003 | Fischer et al. |
| 2006/0211810 A1 | | 9/2006 | Persigehl et al. |
| 2006/0291215 A1 | | 12/2006 | Shirai et al. |
| 2007/0298986 A1 | * | 12/2007 | Daute ........................... 508/465 |
| 2008/0194744 A1 | * | 8/2008 | Ok ....................... C09D 167/02  524/186 |

FOREIGN PATENT DOCUMENTS

| | | | |
|---|---|---|---|
| EP | 0 516 351 A2 | | 5/1986 |
| EP | 1731546 A1 | * | 12/2006 |
| JP | 61-085467 A | | 5/1986 |
| JP | 4-120162 A | | 4/1992 |
| JP | 4-351657 A | | 12/1992 |
| JP | 5-179114 A | | 7/1993 |
| JP | 6-184410 A | | 7/1994 |
| JP | 06188410 A | * | 7/1994 |
| JP | 11-049937 A | | 2/1999 |
| JP | 2000-035509 A | | 2/2000 |
| JP | 2005-194300 A | | 7/2005 |
| JP | 2007-234260 A | | 9/2007 |
| WO | WO 2005082991 A1 | * | 9/2005 |

OTHER PUBLICATIONS

International Search Report (PCT/ISA/210) mailed on Jan. 6, 2009, by the Japanese Patent Office as the International Searching Authority for International Application No. PCT/JP2008/002824.
Extended European Report (W11098-EP) for PCT/JP2008/002824 mailed Jun. 4, 2010.
Riken Vitamin, http://web.archive.org/web/20070516004406/http://www.rikenvitamin/jp/business/chemicals/product/004.html. Published online May 16, 2007.

* cited by examiner

Primary Examiner — Lee Sanderson
(74) Attorney, Agent, or Firm — Buchanan Ingersoll & Rooney P.C.

(57) ABSTRACT

A polybutylene terephthalate resin composition which is free from bleeding and other problems, and improves the flowability (melt-flowability) while maintaining the characteristics such as mechanical strength or toughness. To 100 parts by weight of a composition composed of 50 to 90% by weight of (A) a polybutylene terephthalate resin and 10 to 50% by weight of (B) inorganic filler, is blended 0.05 to 5 parts by weight of (C) a glycerin fatty acid ester being composed of glycerin and/or a dehydrated condensate thereof and a fatty acid having 12 or more carbon atoms and having 200 or more hydroxyl value determined by a method specified in the description.

24 Claims, No Drawings

POLYBUTYLENE TEREPHTHALATE RESIN COMPOSITION AND THIN MOLDED ARTICLE

CROSS REFERENCE TO RELATED APPLICATIONS

The present application is a divisional of U.S. application Ser. No. 12/669,701, filed on Jan. 19, 2010, which is a national stage application of International Application No. PCT/JP2008/002824, filed on Oct. 7, 2008, which claims priority to Japanese Application No. 2007-269683, filed on Oct. 17, 2007. The entire contents of each of U.S. application Ser. No. 12/669,701, International Application No. PCT/JP2008/002824, and Japanese Application No. 2007-269683 are hereby incorporated herein by reference in their entirety.

TECHNICAL FIELD

The present invention relates to a polybutylene terephthalate resin composition having excellent flowability and to a thin-walled molded article thereof, and more particularly to a polybutylene terephthalate resin composition having excellent flowability and being suitable for the injection-molded article for electrical and electronic parts and the like, such as a switch, a capacitor, a connector, an integrated circuit (IC), a relay, a resister, a light-emitting diode (LED), a coil bobbin, a peripheral device thereof, and a housing thereof, and to a thin-walled molded article thereof.

BACKGROUND ART

Since polybutylene terephthalate resin has excellent mechanical characteristics, electrical characteristics, heat resistance, weatherability, water resistance, chemical resistance, and solvent resistance, the resin is widely used in various applications as engineering plastics, in automobile parts, electrical and electronic parts, and the like. Such polybutylene terephthalate resin is used in varieties of molded articles as a single component material. It is also known that inorganic filler such as glass fiber is blended in the polybutylene terephthalate resin in some application fields in order to specifically improve the mechanical characteristics.

Although the composition containing an inorganic filler such as glass fiber has high mechanical strength and stiffness, when it is used as thin-walled plate-like or box-like molding articles, for example, micro-switch casing, small coil bobbin, thin-walled connector, and disk cartridge shutter, the composition raises problems such as insufficient molding (insufficient filling in the mold for manufacturing molded article) caused by the decreased flowability resulted from the blending of reinforcing material, and increase in the generation of warp caused by the non-uniform flow of resin. Therefore, there has been wanted a material having improved flowability.

As the methods for improving the flowability of polybutylene terephthalate resin, for example, in Patent Document 1, there is disclosed a polybutylene terephthalate resin composition prepared by blending polybutylene terephthalates having different viscosity (number-average molecular weight) from each other at a specified blending ratio. Patent Document 1 describes that the resin composition improves the cyclic-fatigue resistance of the molded body and gives high flowability in the molten state. The resin composition of Patent Document 1 is, however, inferior in elongation and the like of the resin compared with the case where sole high-viscosity polybutylene terephthalate is used.

Further, in order to improve the flowability, the addition of a flowability-improving agent to polybutylene terephthalate resin is also known. For example, Patent Document 2 discloses a resin composition in which a thermoplastic polyester resin composed mainly of polytetramethylene terephthalate is blended with a specific aromatic polybasic acid ester as a flowability-improving agent. The resin composition described in Patent Document 2, however, shows a tendency of having somewhat inferior mechanical strength compared with the case where the flowability-improving agent is not added.

Other than above, the use of a flowability-improving agent for resin is a common practice to improve the flowability. However, the use of the flowability-improving agent for resin may induce bleeding and separation of surface layer of the molded article, and further a decrease in the mechanical strength is unavoidable.

At the same time, Patent Document 3 discloses a composition containing a fatty acid ester composed mainly of a polyhydric alcohol, selected from glycerin and pentaerythritol, and a fatty acid having 12 or more carbon atoms. In the document, there is a description that the resin composition has excellent molding processability, specifically pellet-capturing property during injection molding, and has excellent moldability. However, Patent Document 3 does not give a description of the flowability of the resin composition at all.

Patent Document 1: JP-A 5-179114 (Claims and Paragraph [0005])
Patent Document 2: JP-A 61-85467 (Claims)
Patent Document 3: JP-A 4-120162 (Claims)

DISCLOSURE OF THE INVENTION

Problems to be Solved by the Invention

A purpose of the present invention is to provide a polybutylene terephthalate resin composition which is free from bleeding and other problems, and improves the flowability (melt-flowability) while maintaining the characteristics such as mechanical strength and toughness, and to provide a molded article thereof.

Means for Solving the Problems

The inventors of the present invention have conducted detail studies to solve the above problems, and have found that a combination of polybutylene terephthalate resin, inorganic fillers and a specific glycerin fatty acid ester provides a polybutylene terephthalate resin composition which achieves the above purpose without generating bleeding and others, thus having perfected the present invention.

The present invention provides a polybutylene terephthalate resin composition, obtained by blending 100 parts by weight of a composition composed of 50 to 90% by weight of (A) a polybutylene terephthalate resin and 10 to 50% by weight of (B) inorganic filler with 0.05 to 5 parts by weight of (C) a glycerin fatty acid ester being composed of glycerin and/or a dehydrated condensate thereof and a fatty acid having 12 or more carbon atoms having 200 or more hydroxyl value determined by the method specified in the description, and a molded article thereof.

Effect of the Invention

The polybutylene terephthalate resin composition according to the present invention has excellent mechanical strength and toughness, and excellent flowability during melt-molding. Owing to the characteristics, the polybutylene terephthalate resin composition according to the present invention is suitable for electrical and electronic parts such as a switch, a capacitor, a connector, an integrated circuit (IC), a relay, a resister, a light-emitting diode (LED), a coil bobbin, a peripheral device thereof, and a housing thereof.

BEST MODE FOR CARRYING OUT THE INVENTION

[Polybutylene Terephthalate Resin Composition]
(A) Polybutylene Terephthalate Resin The (A) polybutylene terephthalate resin is a thermoplastic resin having polymerization components at least of terephthalic acid (terephthalic acid or an ester-forming derivative thereof) and an alkylene glycol having 4 carbon atoms (1,4-butanediol) or an ester-forming derivative thereof.

The type of polybutylene terephthalate resin (PBT resin) as such a base resin includes a homopolyester (polybutylene terephthalate) which contains butylene terephthalate as a main component [for example, about 50% by weight or more (55 to 100% by weight, for example), preferably about 60% by weight or more (65 to 100% by weight, for example), and more preferably about 70% by weight or more (75 to 100% by weight, for example)], and a copolyester (butylene terephthalate-based copolymer or polybutylene terephthalate copolyester).

Examples of the above-described copolymerizable monomer for the copolyester (butylene terephthalate-based copolymer or modified PBT resin), (hereinafter may also be referred to simply as the "copolymerizable monomer"), are dicarboxylic acid component except terephthalic acid, diol except 1,4-butane diol, oxycarboxylic acid component, and lactone component. One copolymerizable monomer can be used or two or more thereof can be used in combination.

Examples of the dicarboxylic acids (or dicarboxylic acid components or dicarboxylic acids) are: aliphatic dicarboxylic acids ($C_{4-40}$ dicarboxylic acids, preferably $C_{4-14}$ dicarboxylic acids, such as succinic acid, glutaric acid, adipic acid, pimelic acid, suberic acid, azelaic acid, sebacic acid, undecane dicarboxylic acid, dodecane dicarboxylic acid, hexadecane dicarboxylic acid or dimer acid); alicyclic dicarboxylic acid components ($C_{8-12}$ dicarboxylic acids such as hexahydro phthalic acid, hexahydro isophthalic acid, hexahydro terephthalic acid or himic acid); aromatic dicarboxylic acid components except terephthalic acid ($C_{8-16}$ dicarboxylic acids such as phthalic acid, isophthalic acid, naphthalene dicarboxylic acid including 2,6-naphthalene dicarboxylic acid, 4,4'-diphenyl dicarboxylic acid, 4,4'-diphenoxyether dicarboxylic acid, 4,4'-diphenylether dicarboxylic acid, 4,4'-diphenylmethane dicarboxylic acid or 4,4'-diphenylketone dicarboxylic acid); reactive derivatives thereof (for example, lower alkylester (including $C_{1-4}$ alkylester of phthalic acid or isophthalic acid, such as dimethyl phthallic acid or dimethyl isophthalic acid (DMI)), and derivatives being capable of forming esters, such as acid chloride or acid anhydride). Furthermore, if required, there may simultaneously be used polycarboxylic acids such as trimeritic acid or pyromellitic acid, or ester-forming derivatives thereof (such as alcohol ester). When such functional compounds are simultaneously used, a branched polybutylene terephthalate resin can be obtained.

Examples of diol (or diol components or diols) are: aliphatic alkane diols except 1,4-butane diol [including alkane diols (for example, ethylene glycol; trimethylene glycol; propylene glycol; neopentyl glycol; hexane diol (such as 1,6-hexane diol); octane diol (such as 1,3-octane diol or 1,8-octanediol); lower alkane diol such as decane diol; preferably linear or branched $C_{2-12}$ alkane diol, and more preferably linear or branched $C_{2-10}$ alkane diol); (poly) oxy alkylene glycol (for example, glycol having pluralities of oxy$C_{2-4}$ alkylene units, such as diethylene glycol, dipropylene glycol, ditetramethylene glycol, triethylene glycol, tripropylene glycol or polytetramethylene glycol)], alicyclic diols (for example, 1,4-cyclohexane diol, 1,4-cyclohexane dimethanol, hydrogenated bisphenol A), aromatic diol [for example, dihydroxy $C_{6-14}$ arene such as hydroquinone, resorcinol or naphthalene diol; biphenol (such as 4,4'-dihydroxybiphenyl); bisphenols; and xylylene glycol], and reactive derivatives thereof (for example, ester-forming derivatives such as alkyl-, alkoxy-, or halogen-substituted one). Furthermore, if required, there can be used simultaneously polyols such as glycerin, trimethylol propane, trimethylol ethane or pentaerythritol, or ester-forming derivatives thereof. When such polyfunctional compounds are used simultaneously, a branched polybutylene terephthalate resin can be obtained.

Examples of the bisphenols are: bis(hydroxyaryl) $C_{1-6}$ alkanes such as bis(4-hydroxyphenyl)methane(bisphenol F), 1,1-bis(4-hydroxyphenyl)ethane(bisphenol AD), 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hdroxyphenyl)butane, 2,2-bis(4-hydroxyphenyl)-3-methylbutane, 2,2-bis(4-hydroxyphenyl)hexane or 2,2-bis (4-hydroxyphenyl)-4-methylpentane; bis(hydroxyaryl) $C_{4-10}$ cycloalkanes such as 1,1-bis(4-hydroxyphenyl)cyclopentane or 1,1-bis(4-hydroxyphenyl)cyclohexane; 4,4'-dihydroxydiphenylether; 4,4'-dihydroxydiphenylsulfone; 4,4'-dihydroxydiphenylsulfide; 4,4'-dihydroxydiphenylketone; and alkylene oxide additives thereof. The alkylene oxide additives include $C_{2-3}$ alkylene oxide additives of bisphenols (for example, bisphenol A, bisphenol AD, and bisphenol F), such as 2,2-bis[4-(2-hydroxyethoxy)phenyl]propane, diethoxylated bisphenol A (EBPA), 2,2-bis[4-(2-hydroxypropoxy)phenyl]propane or dipropoxylated bisphenol A. The number of added moles of the alkylene oxides ($C_{2-3}$ alkylene oxides such as ethylene oxide or propylene oxide) is within a range of 1 to 10 moles to each hydroxyl group, preferably about 1 to 5 moles.

Oxycarboxylic acids (or oxycarboxylic acid components or oxycarboxylic acids) include oxycarboxylic acids such as oxybenzoic acid, oxynaphthoic acid, hydroxyphenylacetic acid, glycol acid or oxycaproic acid, or derivatives thereof. Lactones include $C_{3-12}$ lactones such as propiolactone, butyrolactone, valerolactone or caprolactone (such as ε-caprolactone).

As of these copolymerizable monomers, preferred ones are diols [$C_{2-5}$ alkyleneglycols (including liner or branched alkylene glycols such as ethylene glycol, trimethylene glycol, propylene glycol or hexane diol), and polyoxy $C_{2-4}$ alkylene glycols having oxyalkylene units of about 2 to 4 of repeating number, (such as diethylene glycol), and bisphenols (bisphenols or alkylene oxide additives thereof)], dicarboxylic acids [$C_{6-12}$ aliphatic dicarboxylic acids (such as adipic acid, pimelic acid, suberic acid, azelaic acid or sebacic acid), asymmetric aromatic dicarboxylic acids substituted by carboxyl group at an asymmetric position of arene ring, and 1,4-cyclohexane dimethanol].

As of these compounds, preferred ones include aromatic compounds such as alkylene oxide additives of bisphenols (specifically bisphenol A), and asymmetric aromatic dicarboxylic acids [such as phthalic acid, isophthalic acid or reactive derivatives thereof (such as lower alkylesters of dimethylisophthalic acid (DMI) and the like).

Preferred polybutylene terephthalate resin includes homopolyester (polybutylene terephthalate) and/or copolymer (polybutylene terephthalate copolyester). The polybutylene terephthalate resin may be a homo- or co-polyester (specifically homo-polyester) normally having the percentage of copolymerizable monomer (modification rate) of 45% by mole or less (for example, about 0 to 45% by mole), preferably 35% by mole or less (for example, about 0 to 35% by mole), and further preferably 30% by mole or less (for example, about 0 to 30% by mole).

Furthermore, in the copolymer, the percentage of the copolymerizable monomer can be selected from a range of about 0.01 to 30% by mole, normally in a range of about 1 to 30% by mole, preferably about 3 to 25% by mole, and more preferably about 5 to 20% by mole (for example, 5 to 15% by mole). When a homopolyester (polybutylene terephthalate) and a copolymer (copolyester) are used in combination, the blending ratio of the homopolyester to the copolyester can be selected in a range of about 0.1 to 30% by mole of the copolymerizable monomer to the total amount of monomer, (preferably 1 to 25% by mole, and more preferably 5 to 25% by mole), normally the ratio of the former to the latter approximately being 99/1 to 1/99 (weight ratio), preferably 95/5 to 5/95 (weight ratio), and more preferably 90/10 to 10/90 (weight ratio).

In addition, the intrinsic viscosity (IV) of the polybutylene terephthalate resin is preferably 1.0 dL/g or less, and may be more preferably 0.9 dL/g or less. By blending polybutylene terephthalate resins having different intrinsic viscosity from each other, for example by blending a polybutylene terephthalate resin having intrinsic viscosity of 1.2 dL/g with a polybutylene terephthalate resin having intrinsic viscosity of 0.8 dL/g, the intrinsic viscosity of 1.0 dL/g or less can be realized. The intrinsic viscosity (IV) can be determined in o-chlorophenol at a temperature of 35° C., for example. When a polybutylene terephthalate resin having an intrinsic viscosity within that range is used, the addition of sufficient toughness and reduced melt viscosity can easily be realized with efficiency. Excessive intrinsic viscosity increases the melt viscosity during molding, which may induce insufficient flow of the resin and insufficient filling of the resin in a mold, in some cases.

In addition, the polybutylene terephthalate resin may be commercially available, and may be used by being manufactured through copolymerization (polycondensation) of terephthalic acid or a reactive derivative thereof with 1,4-butane diol, and if required, a copolymerizable monomer by a common practice such as ester interchange method or direct esterification method.

(B) Inorganic Filler

Examples of the (B) inorganic filler are: fibrous fillers such as glass fiber, graphite fiber, silica fiber, alumina fiber, boron fiber, feldspar, potassium titanate whisker or potassium borate whisker; plate fillers such as mica or glass flake; and powder and granular fillers such as silica, glass bead, glass flake, glass bubble, kaolin, wollastonite, calcium silicate or calcium carbonate. These fillers may be used alone or in combination of two or more of them. As of these, glass fiber is specifically preferred owing to the mechanical strength, heat resistance, and dimensional stability of the composition.

The (B) inorganic filler may be surface-treated, if required. Examples of the compound used for the surface treatment are functional compounds such as epoxy-based compound, isocyanate-based compound, silane-based compound or titanate-based compound. These compounds may be used by surface treatment of the inorganic filler in advance or may be added when preparing materials.

For the resin composition of the present invention, the percentage of the (B) inorganic filler is from 10 to 50% by weight to the sum of the (A) polybutylene terephthalate resin and the (B) inorganic filler, preferably from 10 to 40% by weight. If the percentage thereof is less than 10% by weight, sufficient mechanical strength may not be attained in some cases. If the percentage thereof exceeds 50% by weight, sufficient flowability may not be attained in some cases.

(C) Glycerin Fatty Acid Ester

The present invention is characterized in combining a polybutylene terephthalate resin with a specific glycerin fatty acid ester. Normally, when a flowability-improving agent is added to a polybutylene terephthalate resin, it is unavoidable to deteriorate the characteristics of the polybutylene terephthalate resin, such as mechanical strength, though the flowability can be improved. According to the present invention, however, the flowability of polybutylene terephthalate resin composition can be efficiently improved while maintaining a high level of the above-mentioned characteristics by using a specific glycerin fatty acid ester. In addition, by combining it with inorganic fillers, the strength or the stiffness of resin composition or molded article thereof can be improved. Since the improvement effect of the strength or the stiffness does not deteriorate even when using the glycerin fatty acid ester, the maintaining of the mechanical strength can be combined with the improvement of the flowability in a balanced manner.

The (C) glycerin fatty acid ester is an ester composed of glycerin and/or a dehydrated condensate and a fatty acid having 12 or more carbon atoms. The fatty acid having 12 or more carbon atoms, structuring the ester includes lauric acid, oleic acid, palmitic acid, stearic acid, behenic acid, and montanic acid, preferably fatty acid having 12 to 32 carbon atoms, and more preferably fatty acid having 12 to 22 carbon atoms. As of these, lauric acid, stearic acid, or behenic acid is specifically preferred. Fatty acid having less than 12 carbon atoms is not preferred because the heat resistance may decreases, and fatty acid having more than 32 carbon atoms is not preferred because the effect of improving the flowability is small.

The (C) glycerin fatty acid ester used in the present invention can be manufactured by a known method per se. The (C) glycerin fatty acid ester used in the present invention is the one in which the esterification is adjusted so as the hydroxyl value determined by the method described later to become 200 or more, preferably 250 or more. The hydroxyl value of less than 200 is not preferable because the effect of improving the flowability becomes small.

Preferred esters include glycerin monostearate, glycerin monobehenate, diglycerin monostearate, triglycerin monostearate, tetraglycerin stearate partial ester, and decaglycerin laurate partial ester.

The blending ratio of the (C) glycerin fatty acid ester is from 0.05 to 5 parts by weight to 100 parts by weight of the composition composed of 50 to 90% by weight of the (A) polybutylene terephthalate resin and 10 to 50% by weight of the (B) inorganic filler, and preferably from 0.5 to 3 parts by weight. If the blending ratio of the (C) glycerin fatty acid ester is less than 0.05 parts by weight, sufficient effects of improving the flowability may not be attained. If the blending ratio thereof exceeds 5 parts by weight, the amount of gas generated by molding increases, which may deteriorates the appearance of molded article and may cause mold deposit.

The resin composition according to the present invention may contain, if required, varieties of additives such as other resin (such as thermoplastic resin) within a range where the effect of the present invention is not deteriorated. Other resins include polyester resin except the polybutylene terephthalate resin, polyolefin-based resin, polystyrene-based resin, polyamide-based resin, polycarbonate, polyacetal, polyarylene oxide, polyarylene sulfide, fluororesin, and the like. In addition, there are included copolymers such as acrylonitrile-styrene resin, acrylonitrile-butadiene-styrene resin, ethylene-ethylacrylate resin. Those other resins may be used alone or in combination of two or more of them.

Examples of the additives are organic filler (such as high-boiling aromatic polyester fiber, liquid crystalline polyester fiber, aromatic polyamide fiber, fluororesin fiber or polyimide fiber), stabilizer (such as antioxidant, UV absorber or thermal stabilizer), anti-static agent, fire retardant, fire-retardant assistance, thermoplastic elastomer, coloring matter (such as dye or pigment), lubricator, plasticizer, sliding agent, mold-releasing agent, and crystal-nucleating agent. In the resin composition according to the present invention, a fluorine-based compound such as polytetrafluoroethylene may be used as a dripping inhibitor during combustion. These additives may be used alone or in combination of two or more of them.

The polybutylene terephthalate resin composition according to the present invention may be a mixture of powder or granules, or may be a melted mixture (such as pellet) thereof. In particular, since the resin composition of the present invention has excellent melt-flowability, the respective components [(A) polybutylene terephthalate resin, (B) inorganic filler, (C) glycerin fatty acid ester, and other components added at need] can be efficiently obtained as a molten mixture (melt-kneaded material). The resin composition of the present invention may serve to manufacture the molded body in the form of the mixture (such as powder or granules, or melted mixture).

Concerning the flowability of such resin composition according to the present invention, the melt viscosity under the condition of constant piston flow shear rate can be reflected as an index thereof. For example, the melt viscosity of the resin composition according to the present invention can be brought to 160 Pa·s or less under 1000 sec$^{-1}$ of shear rate at a temperature of 260° C., preferably 150 Pa·s or less, and more preferably 130 Pa·s or less (for example, about 50 to 130 Pa·s). In particular, when the content of the (B) inorganic filler is 30% by weight or less in 100% by weight of the composition composed of the (A) polybutylene terephthalate resin and the (B) inorganic filler, the flowability may become insufficient unless the melt viscosity is 130 Pa·s or less. The measured result is expressed by Pa·s unit, and lower values thereof is accepted as more excellent flowability during melting, and more excellent flowability at the time of molding.

In common practice, the indicator of the flowability uses the Melt Index determined in accordance with ASTM D-1238 under the condition of 235° C. and 2160 g of load. Since the measurement of Melt Index is conducted under a constant load, the shear rate of the piston differs depending on resin. On the contrary, the indicator of melt viscosity determination under a constant piston flow is considered to give an indication of the actual flow characteristics considering that the actual injection molding is performed under a constant piston flow. Accordingly, the present invention adopts the melt viscosity under the constant shear rate condition as a flowability indicator.

[Molded Body]

Since the resin composition according to the present invention has excellent melt flowability as described above, the molding processability is good, and the resin composition is useful in manufacturing molded body or molded article, having high mechanical strength and heat resistance.

Specifically the resin composition according to the present invention is suitable for manufacturing a molded article having thin-walled position. For example, a molded article having part of 0.5 mm or smaller thickness can be formed by a conventional injection molding of polybutylene terephthalate resin at a cylinder temperature of 260° C. and at a mold temperature of 65° C.

There are cases where flow length of 40 mm or more at a thickness of 0.5 mm is required. With the resin composition of the present invention, flow length of 40 mm or more is available.

Examples of the thin-walled molded article having position with a thickness of 0.5 mm or less therein are a connector, a switch, a capacitor, an integrated circuit (IC), a relay, a resistor, a light-emitting diode (LED), a coil bobbin, a peripheral device thereof, and a housing thereof.

The molded body (or molded article) can be manufactured by molding the resin composition composed of the respective components ((A) polybutylene terephthalate resin, (B) inorganic filler, (C) glycerin fatty acid ester, and other components added, if required) by a conventional method. For example, the molded body of the present invention can be manufactured by using any of (i) the method of mixing the components, then forming pellets by kneading and extruding the mixed components through an extruder (uniaxial or twin screw extruder), followed by molding, (ii) the method of preparing pellets having different compositions from each other (master batch), and of blending (diluting) the pellets at a specified amount ratio to mold, then obtaining a molded article having the target composition, and (iii) the method of directly charging one, two or more components to the molding machine. Finely powdering a part of the resin component and adding it to other components by mixing them is a preferred method for performing uniform blending of the components. The above-described fillers and the like can be added at arbitrary time to obtain the target composition.

The molded body can easily be obtained by melting and kneading the above polybutylene terephthalate resin composition, and then applying conventional molding methods such as extrusion molding, compression molding, blow molding, vacuum molding, rotary molding or and gas injection molding, other than the injection molding, and thus the molded article can be efficiently obtained. In particular, injection molding is preferred.

EXAMPLE 1

The present invention is described below in more detail referring to Examples. However, the present invention is not limited to these examples.

EXAMPLES 1 to 10, COMPARATIVE EXAMPLES 1 to 6

The respective resin compositions were dry-blended at the respective blending ratios given in Table 1 and Table 2. The blend was melted and kneaded in a twin screw extruder having a screw diameter of 30 mm, (manufactured by The Japan Steel Works, LTD.) at 250° C. and was pelletized to prepare test pieces. With the test pieces, evaluations were conducted. The result is shown in Tables 1 and 2.

The detail of the used components and the method for determining the physical properties are the following.

(A) Polybutylene Terephthalate Resin
(A-1) Polybutylene terephthalate (intrinsic viscosity (IV=0.69 dL/g, manufactured by Wintech Polymer, Ltd.)
(A-2) Polybutylene terephthalate (intrinsic viscosity IV=0.875 dL/g, manufactured by Wintech Polymer, Ltd.)
(B) Inorganic Filler
Glass fiber (ECS03T187, manufactured by Nippon Electric Glass Co., Ltd.)
(C) Glycerin Fatty Acid Ester
(C-1) Glycerin monostearate (Electro Stripper TS-5, hydroxyl value of 330, manufactured by Kao Corporation)
(C-2) Glycerin monobehenate (Rikemal B-100, hydroxyl value of 300, manufactured by Riken Vitamin Co., Ltd.)
(C-3) Triglycerin stearate partial ester (Rikemal AF-70, hydroxyl value of 280, manufactured by Riken Vitamin Co., Ltd.)
(C-4) Decaglycerin laurate partial ester, Poem L-021, hydroxyl value of 600, manufactured by Riken Vitamin Co., Ltd.)
(C-5) Glycerin mono-12-hydroxy stearate (Rikemal HC-100, hydroxyl value of 420, manufactured by Riken Vitamin Co., Ltd.)
(C-6) Glycerin tristearate (Poem S-95, hydroxyl value of 87, manufactured by Riken Vitamin, Ltd.)

(D) Other Resins
Acrylonitrile-styrene resin (Cevian JD, manufactured by Daicel Chemical Industries, Ltd.
<Hydroxyl Value>
The Hydroxyl value was determined in accordance with Japan Oil Chemists' Society standard 2.4.9.2-71 "Hydroxyl value (pyridine-acetic acid anhydride method)".
<Melt Viscosity>
The prepared pellets were dried at 140° C. for 3 hours, and the dried pellets were tested using Capillograph 1B (manufactured by Toyo Seiki Seisaku-Sho, Ltd.) at shear rate of 1000 sec$^{-1}$ under the condition of a furnace temperature of 260° C., a capillary diameter of 1 mm and a length of 20 mm. Lower values give more excellent flowability at the time of fusion and give more excellent flowability at the time of molding.
<Tensile Strength and Elongation>
The prepared pellets were dried at 140° C. for 3 hours, and the dried pellets were subjected to injection molding at a molding temperature of 260° C. and a mold temperature of 80° C. to obtain the ISO 3167 tensile test pieces. The test pieces were evaluated in accordance with the evaluation criteria specified in ISO 527-1,2.
<Thin-Walled Flowability>
The prepared pellets were dried at 140° C. for 3 hours, and the dried pellets were molded to bar-flow molded articles with a thickness of 0.5 mm and a width of 5 mm. The flowability was determined by the flow length thereof. The evaluation was conducted under the injection conditions of a cylinder temperature of 260° C., a mold temperature of 65° C. and an injection speed of 70 mm/s, at two dwelling levels (50 MPa and 100 MPa).

TABLE 1

|  |  | Examples | | | | | | | | | |
| --- | --- | --- | --- | --- | --- | --- | --- | --- | --- | --- | --- |
|  |  | 1 | 2 | 3 | 4 | 5 | 6 | 7 | 8 | 9 | 10 |
| (A) | A-1 (Parts by weight) | 70 | 70 | 70 | 70 | 70 | 85 | 85 | 51 | 60 | 50 |
|  | A-2 (Parts by weight) |  |  |  |  |  |  |  | 34 |  |  |
| (B) | Glass fiber (Parts by weight) | 30 | 30 | 30 | 30 | 30 | 15 | 15 | 15 | 40 | 40 |
| (C) | C-1 (Parts by weight) | 1 |  |  |  |  |  |  |  |  |  |
|  | C-2 (Parts by weight) |  | 1 |  |  |  |  |  |  |  |  |
|  | C-3 (Parts by weight) |  |  | 1 |  |  | 1 | 1.5 | 1 | 1 | 1 |
|  | C-4 (Parts by weight) |  |  |  | 1 |  |  |  |  |  |  |
|  | C-5 (Parts by weight) |  |  |  |  | 1 |  |  |  |  |  |
|  | C-6 (Parts by weight) |  |  |  |  |  |  |  |  |  |  |
| (D) | AS (Parts by weight) |  |  |  |  |  |  |  |  |  | 10 |
| Evaluation | Melt viscosity (Pa · s) | 108 | 108 | 109 | 100 | 99 | 80 | 68 | 125 | 151 | 160 |
|  | Tensile strength (MPa) | 143 | 143 | 147 | 144 | 145 | 107 | 106 | 103 | 175 | 169 |
|  | Tensile elongation (%) | 2.5 | 2.5 | 2.5 | 2.5 | 2.5 | 3.0 | 3.3 | 2.6 | 2.0 | 1.9 |
|  | Flow length (mm) dwelling 50 MPa | 41 | 41 | 41 | 43 | 43 | 48 | 51 | 38 | 34 | 33 |
|  | dwelling 100 MPa | 61 | 61 | 60 | 63 | 64 | 70 | 75 | 56 | 50 | 49 |

TABLE 2

|  |  | Comparative Examples | | | | | |
| --- | --- | --- | --- | --- | --- | --- | --- |
|  |  | 1 | 2 | 3 | 4 | 5 | 6 |
| (A) | A-1 (Parts by weight) | 70 | 70 | 85 | 51 | 60 | 50 |
|  | A-2 (Parts by weight) |  |  |  | 34 |  |  |
| (B) | Glass fiber (Parts by weight) | 30 | 30 | 15 | 15 | 40 | 40 |
| (C) | C-1 (Parts by weight) |  |  |  |  |  |  |
|  | C-2 (Parts by weight) |  |  |  |  |  |  |
|  | C-3 (Parts by weight) |  |  |  |  |  |  |
|  | C-4 (Parts by weight) |  |  |  |  |  |  |
|  | C-5 (Parts by weight) |  |  |  |  |  |  |
|  | C-6 (Parts by weight) |  |  |  | 1 |  |  |
| (D) | AS (Parts by weight) |  |  |  |  |  | 10 |
| Evaluation | Melt viscosity (Pa · s) | 161 | 155 | 130 | 150 | 202 | 212 |
|  | Tensile strength (MPa) | 147 | 144 | 110 | 107 | 177 | 171 |

TABLE 2-continued

|  | Comparative Examples | | | | | |
| --- | --- | --- | --- | --- | --- | --- |
|  | 1 | 2 | 3 | 4 | 5 | 6 |
| Tensile elongation (%) | 2.5 | 2.5 | 2.9 | 2.6 | 2.1 | 2.0 |
| Flow length (mm) dwelling 50 MPa | 33 | 34 | 37 | 34 | 28 | 27 |
| dwelling 100 MPa | 48 | 49 | 55 | 50 | 41 | 40 |

The invention claimed is:

1. A polybutylene terephthalate resin composition, obtained by blending 100 parts by weight of a composition composed of 50 to 90% by weight of (A) a polybutylene terephthalate resin having an intrinsic viscosity of 0.9 dL/g or less and 10 to 50% by weight of (B) inorganic filler with 0.5 to 3 parts by weight of (C) glycerin fatty acid ester, wherein the glycerin fatty acid ester consists of triglycerin stearate partial ester.

2. The polybutylene terephthalate resin composition according to claim 1, wherein the composition has a melt viscosity of 130 Pa·s or less at a shear rate of 1000 sec$^{-1}$ at a temperature of 260° C.

3. The polybutylene terephthalate resin composition according to claim 1, wherein said (B) inorganic filler is glass fiber.

4. The polybutylene terephthalate resin composition according to claim 1, comprising 0.5 to 2 parts by weight of the glycerin fatty acid ester.

5. A thin-walled molded article comprising the polybutylene terephthalate resin composition according to claim 1, having a flow length of 40 mm or more at a thickness of 0.5 mm following injection molding a cylinder temperature of 260° C. and at a mold temperature of 65° C.

6. The thin-walled molded article according to claim 5, having a position with a thickness of 0.5 mm or less at a part of said molded article.

7. The thin-walled molded article according to claim 6, being a switch, a capacitor, a connector, an integrated circuit (IC), a relay, a resister, a light-emitting diode (LED), a coil bobbin, and a peripheral device thereof or a housing thereof.

8. The polybutylene terephthalate resin composition according to claim 2, having a determined melt viscosity of 50 to 130 Pa·s at a shear rate of 1000 sec$^{-1}$ at a temperature of 260° C.

9. The polybutylene terephthalate resin composition according to claim 3, having a determined melt viscosity of 50 to 130 Pa·s or less at a shear rate of 1000 sec$^{-1}$ at a temperature of 260° C.

10. A thin-walled molded article comprising the polybutylene terephthalate resin composition according to claim 2, having a flow length of 40 mm or more at a thickness of 0.5 mm following injection molding a cylinder temperature of 260° C. and at a mold temperature of 65° C.

11. A thin-walled molded article comprising the polybutylene terephthalate resin composition according to claim 3, having a flow length of 40 mm or more at a thickness of 0.5 mm following injection molding a cylinder temperature of 260° C. and at a mold temperature of 65° C.

12. A thin-walled molded article comprising the polybutylene terephthalate resin composition according to claim 4, having a flow length of 40 mm or more at a thickness of 0.5 mm following injection molding a cylinder temperature of 260° C. and at a mold temperature of 65° C.

13. A thin-walled molded article comprising the polybutylene terephthalate resin composition according to claim 8, having a flow length of 40 mm or more at a thickness of 0.5 mm following injection molding a cylinder temperature of 260° C. and at a mold temperature of 65° C.

14. A thin-walled molded article comprising the polybutylene terephthalate resin composition according to claim 9, having a flow length of 40 mm or more at a thickness of 0.5 mm following injection molding a cylinder temperature of 260° C. and at a mold temperature of 65° C.

15. The thin-walled molded article according to claim 10, having a position with a thickness of 0.5 mm or less at a part of said molded article.

16. The thin-walled molded article according to claim 11, having a position with a thickness of 0.5 mm or less at a part of said molded article.

17. The thin-walled molded article according to claim 12, having a position with a thickness of 0.5 mm or less at a part of said molded article.

18. The thin-walled molded article according to claim 15, being a switch, a capacitor, a connector, an integrated circuit (IC), a relay, a resister, a light-emitting diode (LED), a coil bobbin, and a peripheral device thereof or a housing thereof.

19. The thin-walled molded article according to claim 16, being a switch, a capacitor, a connector, an integrated circuit (IC), a relay, a resister, a light-emitting diode (LED), a coil bobbin, and a peripheral device thereof or a housing thereof.

20. The thin-walled molded article according to claim 17, being a switch, a capacitor, a connector, an integrated circuit (IC), a relay, a resister, a light-emitting diode (LED), a coil bobbin, and a peripheral device thereof or a housing thereof.

21. The thin-walled molded article according to claim 5, having a tensile strength of 103 to 147 MPa according to ISO 527-1,2 with a tensile test piece according to ISO 3167 and an elongation of 2.5 to 3.3% according to ISO 527-1,2 with a tensile test piece according to ISO 3167 and a tensile test piece according to ISO 3167.

22. The thin-walled molded article according to claim 10, having a tensile strength of 103 to 147 MPa according to ISO 527-1,2 with a tensile test piece according to ISO 3167 and an elongation of 2.5 to 3.3% according to ISO 527-1,2 with a tensile test piece according to ISO 3167 and a tensile test piece according to ISO 3167.

23. The thin-walled molded article according to claim 11, having a tensile strength of 103 to 147 MPa according to ISO 527-1,2 with a tensile test piece according to ISO 3167 and an elongation of 2.5 to 3.3% according to ISO 527-1,2 with a tensile test piece according to ISO 3167 and a tensile test piece according to ISO 3167.

24. The thin-walled molded article according to claim 12, having a tensile strength of 103 to 147 MPa according to ISO 527-1,2 with a tensile test piece according to ISO 3167 and an elongation of 2.5 to 3.3% according to ISO 527-1,2 with a tensile test piece according to ISO 3167 and a tensile test piece according to ISO 3167.

* * * * *